US012604371B2

(12) United States Patent
Sato

(10) Patent No.: US 12,604,371 B2
(45) Date of Patent: Apr. 14, 2026

(54) HEATER

(71) Applicant: KYOCERA Corporation, Kyoto (JP)

(72) Inventor: Masataka Sato, Sendai (JP)

(73) Assignee: KYOCERA CORPORATION, Kyoto (JP)

( * ) Notice: Subject to any disclaimer, the term of this patent is extended or adjusted under 35 U.S.C. 154(b) by 798 days.

(21) Appl. No.: 17/916,655

(22) PCT Filed: Apr. 1, 2021

(86) PCT No.: PCT/JP2021/014178
§ 371 (c)(1),
(2) Date: Oct. 3, 2022

(87) PCT Pub. No.: WO2021/201234
PCT Pub. Date: Oct. 7, 2021

(65) Prior Publication Data

US 2023/0156871 A1 May 18, 2023

(30) Foreign Application Priority Data

Apr. 3, 2020 (JP) ................................ 2020-067452

(51) Int. Cl.
*H05B 3/48* (2006.01)
*F23Q 7/00* (2006.01)

(52) U.S. Cl.
CPC .............. *H05B 3/48* (2013.01); *F23Q 7/001* (2013.01)

(58) Field of Classification Search
CPC .... H05B 2203/027; H05B 3/48; H05B 3/141; H05B 2203/017; H05B 3/02; H05B 3/10; H05B 3/14; H05B 3/44; F23Q 7/001; F23Q 2007/004; F23Q 7/00; F02B 1/04; F02B 23/0624; F02B 23/0657; F02B 23/0675
USPC ............... 219/270, 205, 260, 264; 123/145; 174/152; 264/614, 616; 445/32, 7; 419/19
See application file for complete search history.

(56) References Cited

U.S. PATENT DOCUMENTS 4,475,029 A * 10/1984 Yoshida ................. F23Q 7/001 361/266
5,084,607 A 1/1992 Shafer et al.
2015/0059679 A1 3/2015 Ohtani

FOREIGN PATENT DOCUMENTS

JP 02-075187 A 3/1990
JP 2019113225 A * 7/2019

* cited by examiner

*Primary Examiner* — Vy T Nguyen
(74) *Attorney, Agent, or Firm* — Volpe Koenig

(57) ABSTRACT

A heater includes a base, a heat element embedded in the base, a cylindrical body including a first end and a second end being open, and a metal fixture including a first hole receiving the cylindrical body. The cylindrical body includes a first cylinder including the first end and a second cylinder including the second end and continuous with the first cylinder. The second cylinder has a smaller outer diameter than the first cylinder. The cylindrical body includes a ridge located on an outer circumferential surface of the second cylinder and extending in an axial direction of the second cylinder. The cylindrical body receives the base with an end of the base placed and fixed through the first end being open. An inner circumferential surface of the first hole surrounds the second cylinder. The metal fixture is in contact with the at least one ridge.

11 Claims, 4 Drawing Sheets

HEATER

TECHNICAL FIELD

The present disclosure relates to a heater to be used in a combustion gas atmosphere.

BACKGROUND OF INVENTION

A known technique is described in, for example, Patent Literature 1.

CITATION LIST

Patent Literature

Patent Literature 1: Japanese Unexamined Patent Application Publication No. 2-75187

SUMMARY

In one or more aspects of the present disclosure, a heater includes a base in a rod shape or a cylindrical shape, a heat element embedded in the base, a cylindrical body including a first end and a second end being open, and a metal fixture including a first hole receiving the cylindrical body. The cylindrical body includes a first cylinder including the first end and a second cylinder including the second end and continuous with the first cylinder. The second cylinder has a smaller outer diameter than the first cylinder. The cylindrical body includes at least one ridge located on an outer circumferential surface of the second cylinder and extending in an axial direction of the second cylinder. The cylindrical body receives the base with an end of the base placed and fixed through the first end being open. An inner circumferential surface of the first hole surrounds the second cylinder. The metal fixture is in contact with the at least one ridge.

BRIEF DESCRIPTION OF THE DRAWINGS

The objects, features, and advantages of the present disclosure will become more apparent from the following detailed description and the drawings.

DESCRIPTION OF EMBODIMENT

Various heaters that form the basis of a heater according to one or more embodiments of the present disclosure have been developed, including heaters for ignition devices of combustion equipment and glow plugs of automobile engines. For example, Patent Literature 1 describes a heater including cylindrical body externally fitted around the outer periphery of a base including an embedded heat element, and placed and fixed in a cylindrical housing.

In such a heater having the structure that forms the basis of the heater according to one or more embodiments of the present disclosure, the cylindrical body under an external force applied in the axis direction may slip off the housing, lowering the durability and reliability of the heater.

The heater according to one or more embodiments of the present disclosure will now be described in detail with reference to the drawings.

Figure 1:
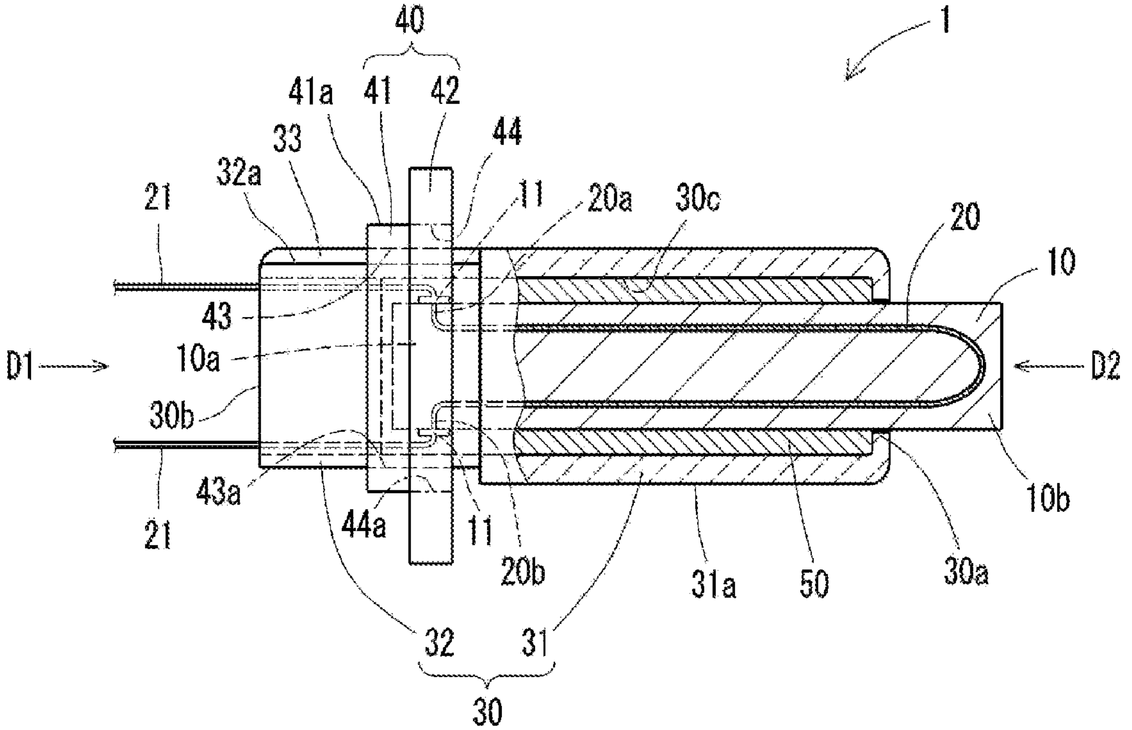
FIG. 1 is a sectional view of a heater according to an embodiment of the present disclosure.
Figure 2:
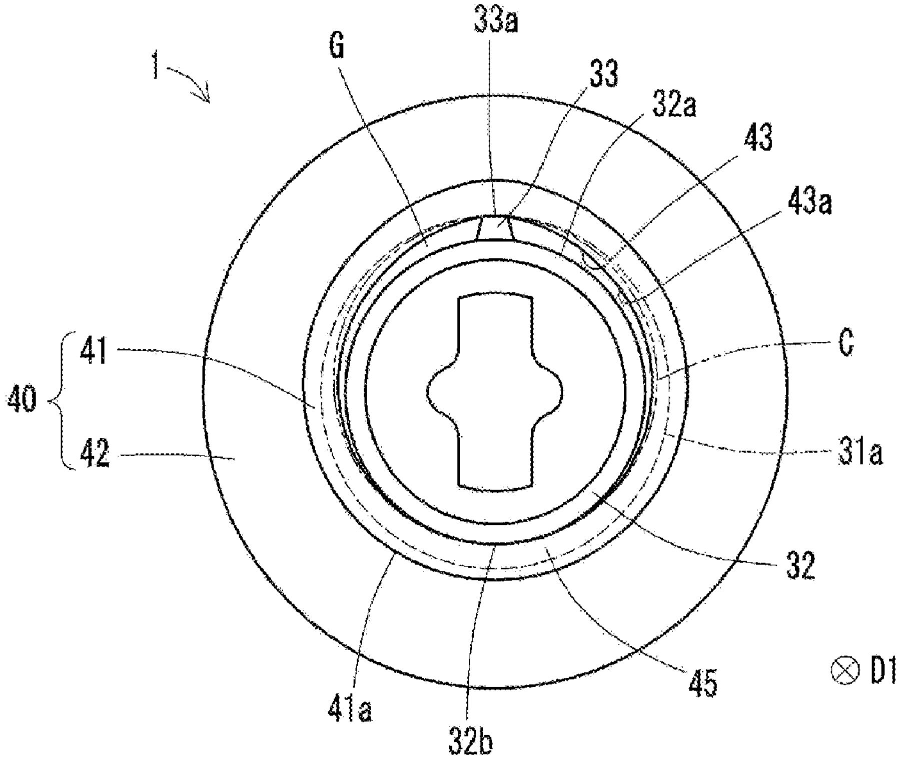
FIG. 2 is a plan view of the heater according to the embodiment of the present disclosure.
Figure 3:
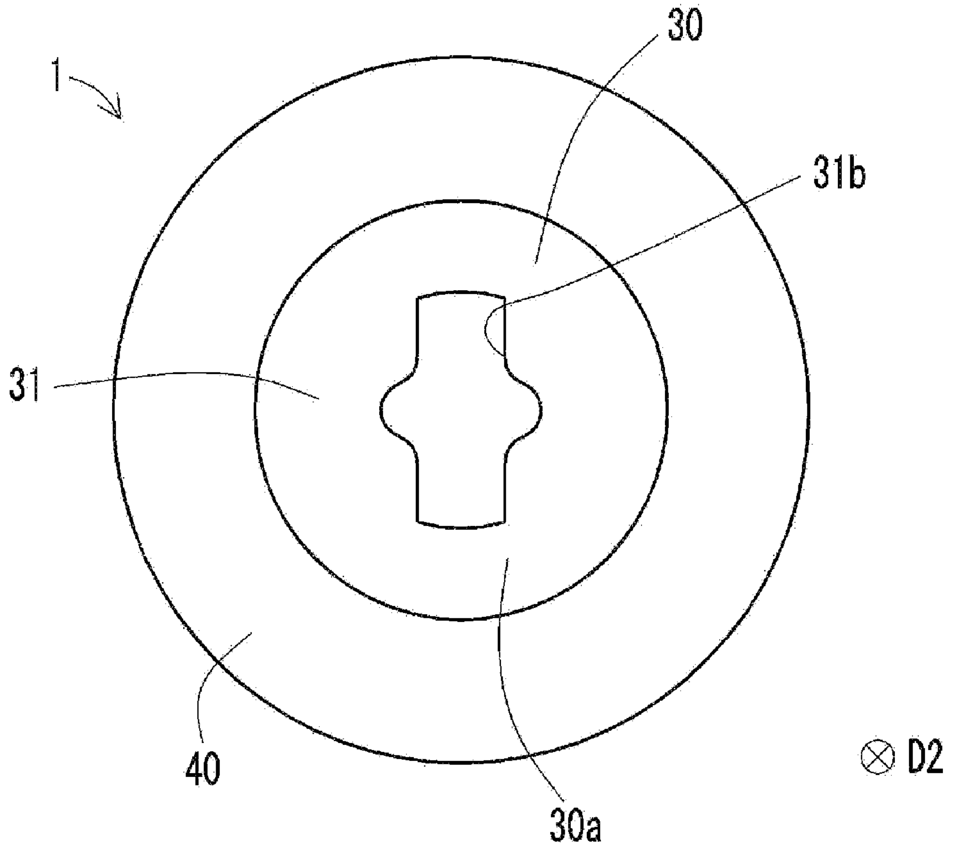
FIG. 3 is a plan view of the heater according to the embodiment of the present disclosure.

FIG. 1 is a sectional view of the heater according to an embodiment of the present disclosure. FIG. 2 is a plan view of the heater according to the embodiment of the present disclosure. FIG. 3 is a plan view of the heater according to the embodiment of the present disclosure. FIG. 1 illustrates a cross section of the heater taken in the longitudinal direction of a base. FIG. 2 is a view of the heater illustrated in FIG. 1 as viewed in a D1 direction indicated by an arrow. FIG. 3 is view of the heater illustrated in FIG. 1 as viewed in a D2 direction indicated by an arrow. The D1 direction (hereafter, simply referred to as a first direction D1) and the D2 direction (hereafter, simply referred to as a second direction D2) are along the length of the base. In FIGS. 2 and 3, components other than a cylindrical body and a metal fixture are not illustrated.

A heater 1 according to the present embodiment includes a base 10, a heat element 20, a cylindrical body 30, and a metal fixture 40.

The base 10 is a rod or a cylindrical member with a length in a longitudinal direction and includes one end 10*a* and the other end 10*b*. The base 10 may include, for example, a round rod or a polygonal rod such as a square rod (hereafter also referred to as a plate), or a hexagonal rod. The base 10 may be in the shape of, for example, a cylinder or a polygonal cylinder, such as a square cylinder or a hexagonal cylinder. The base 10 included in the heater 1 according to the present embodiment is a plate, as illustrated in, for example, FIG. 1. The base 10 being a plate has, for example, a length of 30 to 60 mm, a width of 4.7 to 9 mm, and a thickness of 1.3 to 6 mm.

The base 10 is made of an insulating material. The base 10 is, for example, a sintered body made of an electrically insulating ceramic material. Examples of the ceramic material used for the base 10 include oxide ceramics, nitride ceramics, and carbide ceramics. The ceramic material used for the base 10 may be, for example, alumina ceramics, silicon nitride ceramics, aluminum nitride ceramics, or silicon carbide ceramics.

The base 10 made of silicon nitride ceramics has high strength, toughness, insulation, and heat resistance. The base 10 made of silicon nitride ceramics can be obtained with, for example, a method described below. A sintering aid is first mixed with silicon nitride that is a main component of silicon nitride ceramics to prepare a mixture. The sintering aid contains 5 to 15 mass % of rare earth element oxide, such as yttrium oxide, ytterbium oxide, or erbium oxide, 0.5 to 5 mass % of aluminum oxide, and silicon dioxide with a volume in a sintered body adjusted to be 1.5 to 5 mass %. The mixture is formed into a predetermined shape to produce a molded body. The molded body is then hot-pressed and fired at a temperature of 1650 to 1780° C. to obtain the base 10 made of silicon nitride ceramics.

The heat element 20 is a wire member that generates heat when energized. The heat element 20 is embedded in the base 10. The heat element 20 included in the heater 1 according to the present embodiment has a folded shape including a bend as illustrated in, for example, FIG. 1. The heat element 20 has, for example, a circular, elliptical, or polygonal cross section. The cross section herein refers to a section perpendicular to the direction in which the heat element 20 extends.

The heat element 20 includes one end 20*a* and the other end 20*b*. The end 20*a* and the other end 20*b* are connected to respective two conductor layers 11 on the surface of the end 10*a* of the base 10 as illustrated in, for example, FIG. 1. The two conductor layers 11 serve as the electrodes of the heater 1. Two lead terminals 21 for electrical connection with an external power supply are connected to the respective two conductor layers 11. The conductor layer 11 is made of a metal material such as silver or copper. The conductor layer 11 can be formed by, for example, screen printing. The conductor layer 11 has, for example, a rectangular surface opposite to its surface facing the base 10. The conductor layer 11 has, for example, a length of 5 mm in the longitudinal direction of the base 10 (hereafter, simply referred to as the longitudinal direction), a width of 6 mm, and a thickness of 100 μm.

The heat element 20 has, for example, a total length of 40 to 250 mm, and has a cross-sectional area of 0.0001 to 2 $mm^2$. The heat element 20 can contain, as a main component, a carbide such as tungsten, molybdenum, and titanium, a nitride, or a silicide.

When the base 10 is made of silicon nitride ceramics, the heat element 20 may be made of tungsten carbide. This allows the coefficient of thermal expansion of the base 10 to be approximated to that of the heat element 20, thus avoiding disconnection of the heat element 20 under heat cycling.

When the base 10 is made of silicon nitride ceramics, the heat element 20 may contain tungsten carbide as a main component and may contain 20 mass % or greater of silicon nitride. This allows the coefficient of thermal expansion of the base 10 to be approximated to that of the heat element 20. This structure reduces thermal stress caused by the thermal expansion difference between the base 10 and the heat element 20 when the heater 1 is heated or cooled.

Each lead terminal 21 includes one end and the other end. One end of the lead terminal 21 is joined to the end 10*a* of the base 10 with the conductor layer 11, thus electrically connecting the lead terminal 21 to the heat element 20. The other end of the lead terminal 21 is connected to an external power supply. The lead terminal 21 and the conductor layer 11 may be joined with, for example, a brazing material. Examples of the brazing material include silver solder, gold-copper solder, and silver-copper solder. The lead terminal 21 is made of, for example, nickel. A portion of the lead terminal 21 other than its portions connected to the conductor layer 11 and to the external power supply may be covered with an insulating tube. This can reduce contact between the two lead terminals 21. The tube may be made of, for example, a resin material with high heat resistance, such as a fluororesin.

The cylindrical body 30 protects the base 10 and the lead terminals 21. The cylindrical body 30 may be in the shape of a cylinder, or for example, a polygonal cylinder, such as a square cylinder or a hexagonal cylinder. The cylindrical body 30 included in the heater 1 according to the present embodiment is cylindrical. The cylindrical body 30 has a first end 30*a* and a second end 30*b* being open. The end 10*a* of the base 10 is placed through the opening at the first end 30*a* and is fixed.

The cylindrical body 30 includes a first cylinder 31 having the first end 30*a* and a second cylinder 32 having the second end 30*b*. The second cylinder 32 is continuous with the first cylinder 31. The second cylinder 32 has a smaller outer diameter than the first cylinder 31.

The first cylinder 31 and the second cylinder 32 in the heater 1 according to the present embodiment are cylindrical. The first cylinder 31 has an axis aligned with an axis of the second cylinder 32. The axial direction of the first cylinder 31 and the axial direction of the second cylinder 32 are along the length of the base 10.

As illustrated in, for example, FIG. 3, the opening at the first end 30*a* of the cylindrical body 30 may be shaped to substantially match the planar shape of the base 10 as viewed in the second direction D2. This allows the cylindrical body 30 to tightly hold the base 10.

An adhesive 50 is filled between the base 10 and an inner circumferential surface 30*c* of the cylindrical body 30 to fix the base 10 and the cylindrical body 30 to each other. The adhesive 50 may cover the joints between the base 10 and the lead terminals 21. This improves the reliability of the electrical connection between the heater 1 and the external power supply. This thus improves the durability and reliability of the heater 1. The adhesive 50 may fill the entire space defined by the inner circumferential surface 30*c* of the cylindrical body 30.

The opening at the first end 30*a* may include a cutout from the center of the opening 31*b* as illustrated in, for example, FIG. 3. This allows the adhesive 50 to be filled between the surface of the base 10 and the inner circumferential surface 30*c* of the cylindrical body 30 through the cutout after the end 10*a* of the base 10 is placed through the opening in manufacturing the heater 1. This reduces damage to the joints between the base 10 and the lead terminals 21 in the process of filling the adhesive 50.

The cylindrical body 30 includes at least one ridge 33 on an outer circumferential surface 32*a* of the second cylinder 32 as illustrated in, for example, FIGS. 1 and 2. The ridge 33 extends in the longitudinal direction. The at least one ridge 33 may include an arc-shaped tip surface 33*a* opposite to its surface in contact with the outer circumferential surface 32*a* of the second cylinder 32 as viewed in a section perpendicular to the longitudinal direction. Although FIGS. 1 and 2 illustrate one ridge 33 on the outer circumferential surface 32*a* of the second cylinder 32, the at least one ridge 33 may be multiple ridges 33.

The metal fixture 40 holds the cylindrical body 30 to facilitate mounting of the cylindrical body 30 on an external device. The metal fixture 40 is fixed to the external device. Examples of the external device include a heating device and a gas range. The metal fixture 40 has a flange shape. The metal fixture 40 is made of a metal material such as stainless steel or an iron-nickel-cobalt alloy.

The metal fixture 40 includes a cylindrical part 41 and a plate member 42. The cylindrical part 41 includes a first hole 43 extending through the cylindrical part 41 in its axial direction. The axial direction of the cylindrical part 41 is along the length of the base 10. The plate member 42 includes a second hole 44 extending through the plate member 42 in its thickness direction. The second hole 44 includes an inner circumferential surface 44*a* connected to an outer circumferential surface 41*a* of the cylindrical part 41. The cylindrical part 41 and the plate member 42 may be integral with each other or separate members.

The cylindrical body 30 is placed in the first hole 43 of the metal fixture 40. Without the cylindrical body 30 being placed in the metal fixture 40, the inner diameter of the first hole 43 of the metal fixture 40 is substantially equal to the diameter of an imaginary circle C (refer to FIG. 2) circumscribed by the second cylinder 32 including the ridge 33. In this state, the inner diameter of the first hole 43 may be, for example, 100% of the diameter of the imaginary circle C, or may be greater than or equal to 70% and less than 100% of the diameter of the imaginary circle C. With the cylindrical body 30 placed in the first hole 43 of the metal fixture 40, a portion of the metal fixture 40 adjacent to the inner circumferential surface 43*a* can deform elastically toward the cylindrical body 30 as illustrated in, for example, FIG. 2.

The inner circumferential surface 43*a* of the first hole 43 in the metal fixture 40 surrounds the outer circumferential surface 32*a* of the second cylinder 32 and is in contact with the ridge 33. In other words, in the cylindrical body 30, the second cylinder 32 including the ridge 33 is press-fitted in the first hole 43, and the tip surface 33*a* of the ridge 33 and a contact area 32*b* of the outer circumferential surface 32*a* of the second cylinder 32 is in contact with the inner circumferential surface 43*a* of the first hole 43 as illustrated in, for example, FIG. 2. The cylindrical body 30 is held in the metal fixture 40 under a frictional force generated between the tip surface 33*a* and the inner circumferential surface 43*a* and a frictional force generated between the contact area 32*b* and the inner circumferential surface 43*a*.

The contact area 32*b* herein refers to a partial area of the outer circumferential surface 32*a* of the second cylinder 32 that is in contact with the inner circumferential surface 43*a* of the first hole 43 when the cylindrical body 30 is press-fitted in the first hole 43. For the structure with one ridge 33 on the outer circumferential surface 32*a* of the second cylinder 32, the contact area 32*b* may be at a position opposite to the ridge 33 in the radial direction of the second cylinder 32 as illustrated in, for example, FIG. 2. For the structure with multiple ridges 33 on the outer circumferential surface 32*a* of the second cylinder 32, one or more contact areas 32*b* may be defined or no contact area 32*b* may be defined.

As illustrated in, for example, FIG. 2, the metal fixture 40 includes a portion 45 (hereafter, also referred to as a contact portion) that is located inward from an outer circumferential surface 31*a* of the first cylinder 31 when the cylindrical body 30 is press-fitted in the first hole 43. The contact portion 45 has a smaller height from the outer circumferential surface 32*a* of the second cylinder 32 than from the outer circumferential surface 31*a* of the first cylinder 31 and overlaps the first cylinder 31 as viewed in the first direction D1. Although the cylindrical body 30 moves relative to the metal fixture 40 in the second direction D2 under an external force in the second direction D2 applied to the cylindrical body 30, the first cylinder 31 included in the cylindrical body 30 comes in contact with the contact portion 45 and is thus restricted from moving further in the second direction D2. As described above, the heater 1 according to the present embodiment includes the cylindrical body 30 that avoids slipping off the metal fixture 40 under an external force applied in the second direction D2. The heater 1 can thus have improved durability and reliability.

In the heater 1 according to the present embodiment, a clearance G is left between the outer circumferential surface 32*a* of the second cylinder 32 and the inner circumferential surface 43*a* of the first hole 43 due to the ridge 33 on the outer circumferential surface 32*a* of the second cylinder 32. This allows the metal fixture 40 to thermally expand toward the clearance G under heat cycling, thus reducing thermal stress applied from the metal fixture 40 to the cylindrical body 30. As a result, the cylindrical body 30 is less likely to crack. This thus improves the durability and reliability of the heater 1.

In the heater 1 according to the present embodiment as illustrated in, for example, FIG. 1, the tip surface 33*a* of the ridge 33 and the outer circumferential surface 31*a* of the first cylinder 31 are at the same height from the outer circumferential surface 32*a* of the second cylinder 32. The tip surface 33*a* and the outer circumferential surface 31*a* are flush with each other, thus improving the mechanical strength of the ridge 33. This thus improves the durability and reliability of the heater 1.

In the heater 1 according to the present embodiment as illustrated in, for example, FIG. 1, the inner circumferential surface 44*a* of the plate member 42 is connected to an end of the outer circumferential surface 41*a* of the cylindrical part 41 facing the first end 30*a* of the cylindrical body 30. In this case, the metal fixture 40 has its portion adjacent to the first cylinder 31 with improved mechanical strength, and can effectively regulate the relative movement of the cylindrical body 30 in the second direction D2. The cylindrical body 30 can effectively avoid slipping off the metal fixture 40 under an external force applied in the second direction D2. The heater 1 can thus have improved durability and reliability.

Although FIG. 1 illustrates the first cylinder 31 and the metal fixture 40 being separate in the longitudinal direction, the first cylinder 31 and the metal fixture 40 may be in contact with each other. This reduces cracks in the cylindrical body 30 that may occur when the cylindrical body 30 moves rapidly relative to the metal fixture 40 in the second direction D2 with a large impact acting on the cylindrical body 30 in the second direction D2 and collides with the metal fixture 40. This thus improves the durability and reliability of the heater 1.

As illustrated in, for example, FIG. 1, the metal fixture 40 may overlap the joints between the base 10 and the lead terminals 21 as viewed in the radial direction of the cylindrical body 30. This allows heat generated in the heat element 20 and transferred to the joints between the base 10 and the lead terminals 21 to be dissipated outside through the metal fixture 40, thus avoiding excess heating of the joints between the base 10 and the lead terminals 21. This improves the reliability of the electrical connection between the heater 1 and the external power supply. This thus improves the durability and reliability of the heater 1.

The heater 1 according to variations of the present embodiment will now be described with reference to FIGS. 4 to 9.

Figure 4:
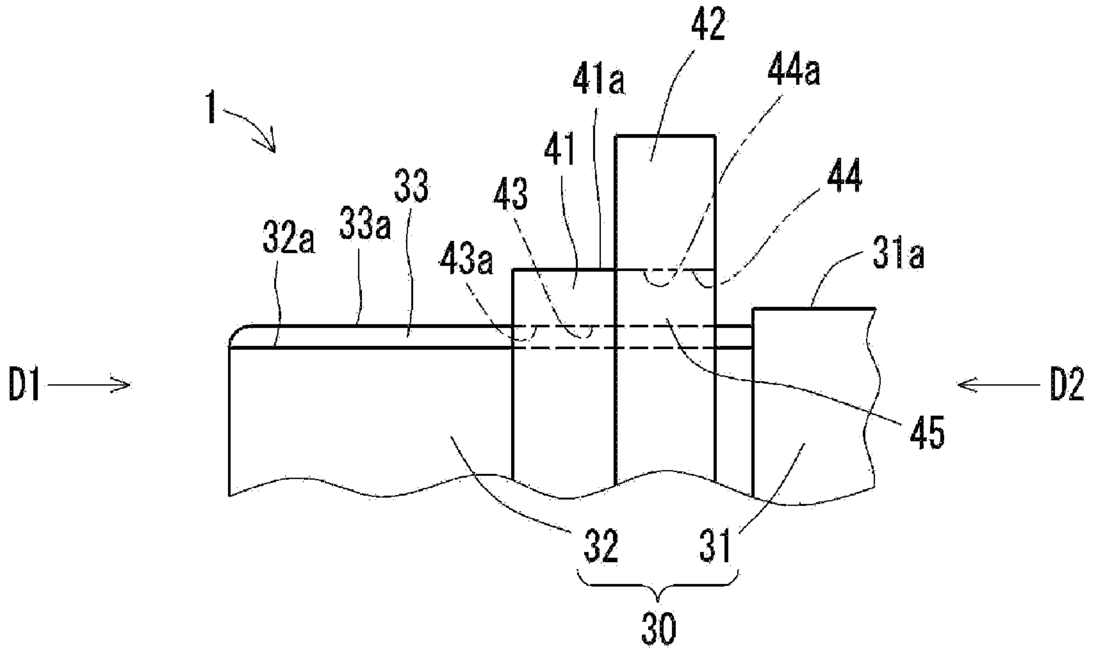
FIG. 4 is an enlarged plan view of a main part of the heater according to a variation of the embodiment of the present disclosure.
Figure 5:
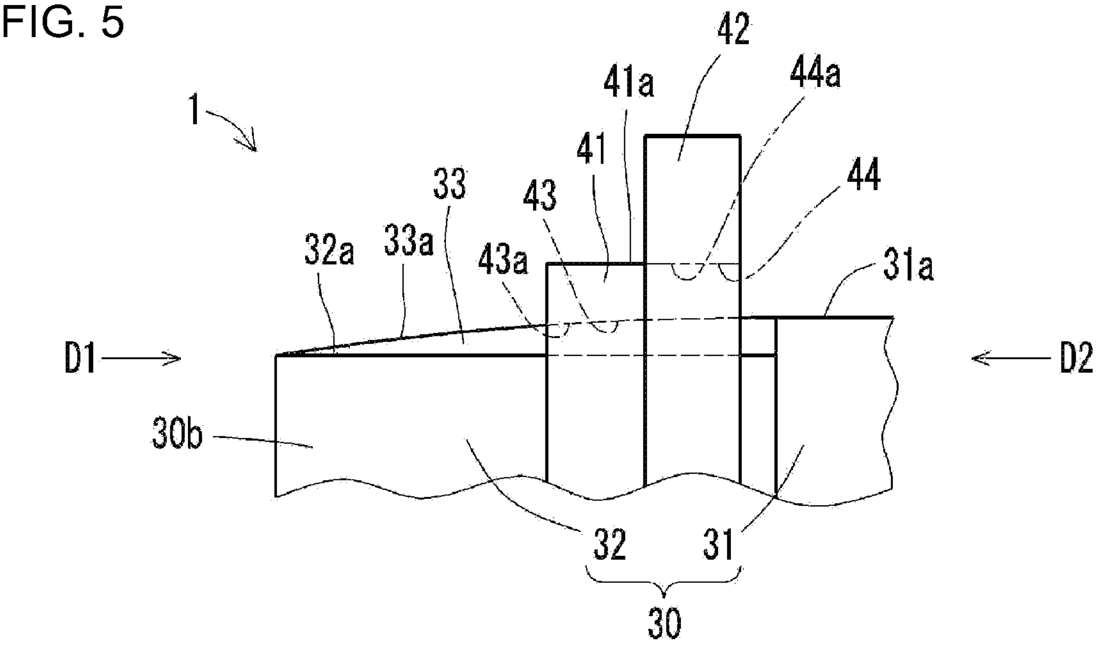
FIG. 5 is an enlarged plan view of a main part of the heater according to a variation of the embodiment of the present disclosure.
Figure 6:
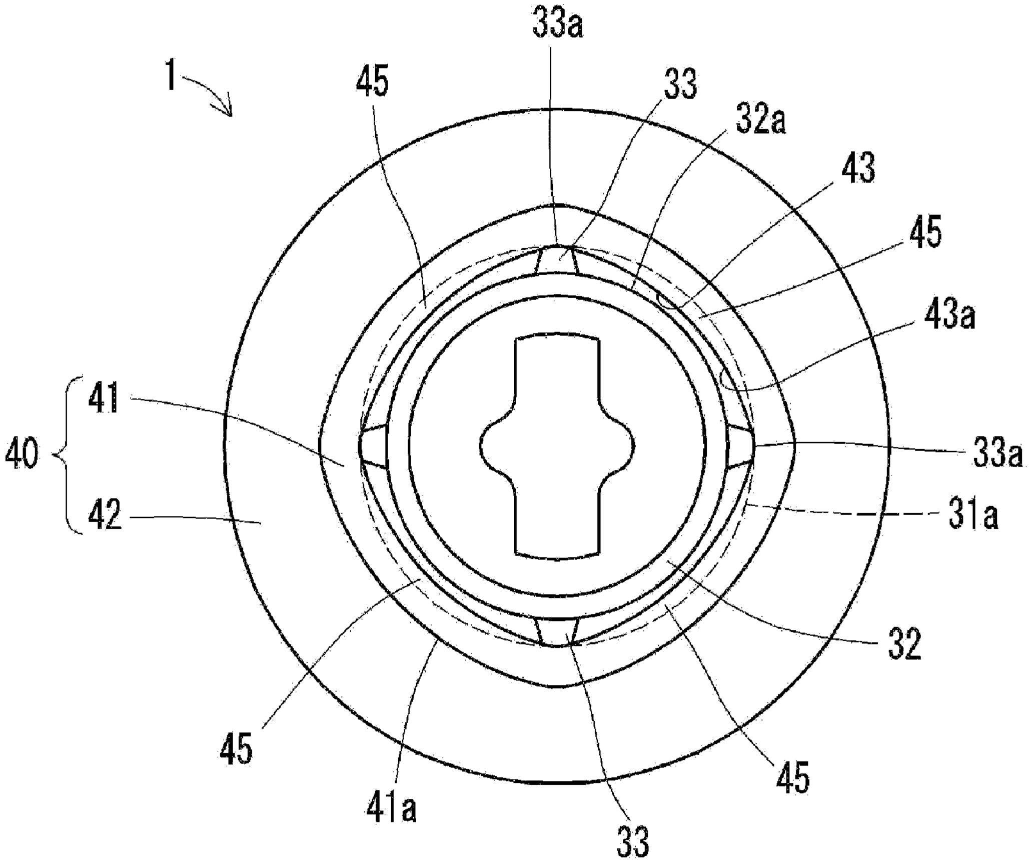
FIG. 6 is a plan view of the heater according to a variation of the embodiment of the present disclosure.
Figure 7:
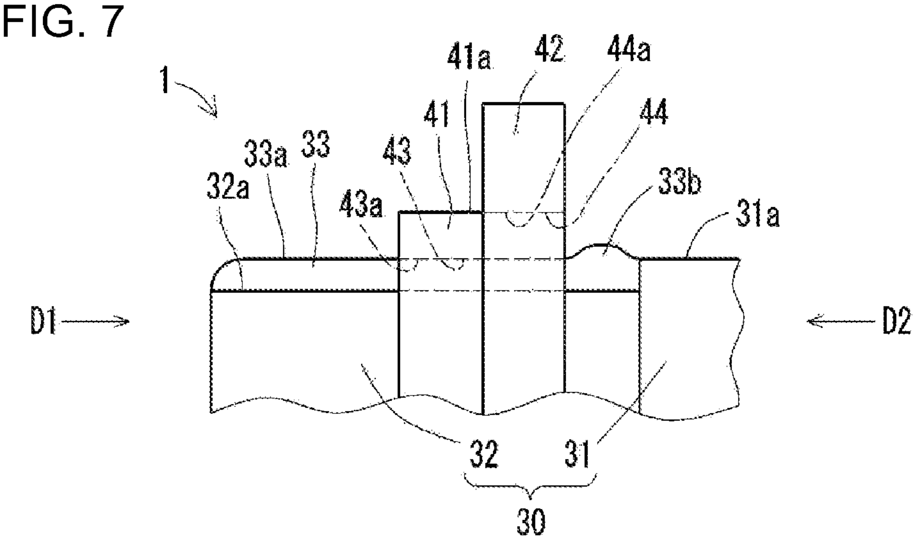
FIG. 7 is an enlarged plan view of a main part of the heater according to a variation of the embodiment of the present disclosure.
Figure 8:
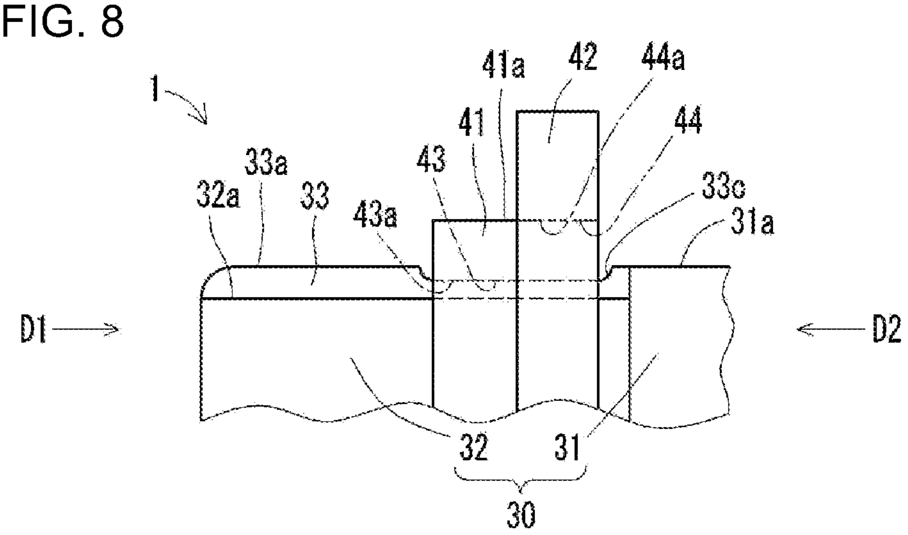
FIG. 8 is an enlarged plan view of a main part of the heater according to a variation of the embodiment of the present disclosure.
Figure 9:
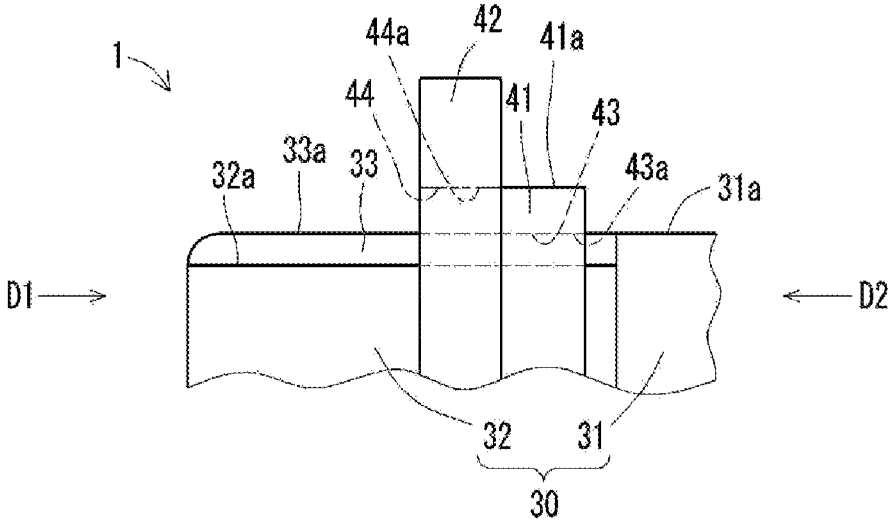
FIG. 9 is an enlarged plan view of a main part of the heater according to a variation of the embodiment of the present disclosure.

FIG. 4 is an enlarged plan view of a main part of the heater according to a variation of the embodiment of the present disclosure. FIG. 5 is an enlarged plan view of a main part of the heater according to a variation of the embodiment of the present disclosure. FIG. 6 is a plan view of the heater according to a variation of the embodiment of the present disclosure. FIG. 7 is an enlarged plan view of a main part of the heater according to a variation of the embodiment of the present disclosure. FIG. 8 is an enlarged plan view of a main part of the heater according to a variation of the embodiment of the present disclosure. FIG. 9 is an enlarged plan view of a main part of the heater according to a variation of the embodiment of the present disclosure. FIGS. 4, 5, and 7 to 9 each are an enlarged view of a portion near the ridge in the heater. FIG. 6 corresponds to the plan view of FIG. 2.

As illustrated in, for example, FIG. 4, the tip surface 33*a* of the ridge 33 may be at a lower height from the outer circumferential surface 32*a* of the second cylinder 32 than the outer circumferential surface 31*a* of the first cylinder 31. As a result, the entire portion of the metal fixture 40 near the inner circumferential surface 43*a* serves as the contact portion 45. In this structure, the cylindrical body 30 can effectively avoid slipping off the metal fixture 40 under an external force applied in the second direction D2. This thus improves the durability and reliability of the heater 1.

For a certain number of ridges 33 or for a ridge 33 at a certain position, the ridge(s) 33 may be at a greater height from the outer circumferential surface 32*a* of the second cylinder 32 than from the outer circumferential surface 31*a* of the first cylinder 31. As illustrated in, for example, FIG. 2, when a single elongated ridge 33 is on the second cylinder 32, the metal fixture 40 can include the contact portion 45 for any height of the ridge 33. The cylindrical body 30 can avoid slipping off the metal fixture 40 under an external force applied in the second direction D2.

As illustrated in, for example, FIG. 5, at least one ridge 33 may have a gradually decreasing height from the outer circumferential surface 32*a* of the second cylinder 32 toward the second end 30*b* of the cylindrical body 30. The contact area between the tip surface 33*a* and the inner circumferential surface 43*a* is larger as compared with when the height of the ridge 33 from the outer circumferential surface 32*a* is constant. The cylindrical body 30 can be firmly fixed to the metal fixture 40. In manufacturing the heater 1, for example, the second end 30*b* of the cylindrical body 30 can be easily press-fitted into the first hole 43. The press-fitting can be stopped at the position of the cylindrical body 30 firmly fixed to the metal fixture 40, thus with no excess stress being applied to the cylindrical body 30. The cylindrical body 30 and the metal fixture 40 can thus be fixed firmly while reducing cracks in the cylindrical body 30.

As illustrated in, for example, FIG. 6, at least one ridge 33 may be multiple ridges 33. The multiple ridges 33 may be located on the outer circumferential surface 32*a* of the second cylinder 32 and may be spaced from one another in the circumferential direction of the second cylinder 32. Although FIG. 6 illustrates four ridges 33 on the outer circumferential surface 32*a*, two, three, or five or more ridges 33 may be located on the outer circumferential surface 32*a*.

Such multiple ridges 33 on the outer circumferential surface 32*a* of the second cylinder 32 have their tip surfaces 33*a* in contact with the inner circumferential surface 43*a* of the first hole 43. This increases a frictional force between the cylindrical body 30 and the metal fixture 40, allowing the metal fixture 40 to hold the cylindrical body 30 firmly. This improves the durability and reliability of the heater 1. The structure including the multiple ridges 33 on the outer circumferential surface 32*a* as illustrated in, for example, FIG. 6 may eliminate the contact area 32*b* on the outer circumferential surface 32*a* of the second cylinder 32.

For the multiple ridges 33 on the outer circumferential surface 32*a*, the metal fixture 40 can include multiple contact portions 45 when the cylindrical body 30 is press-fitted in the first hole 43, as illustrated in, for example, FIG. 6. This allows the metal fixture 40 to effectively regulate the relative movement of the cylindrical body 30 in the second direction D2. The cylindrical body 30 can thus effectively avoid slipping off the metal fixture 40 under an external force applied in the second direction D2.

As illustrated in, for example, FIG. 6, the multiple ridges 33 may be at equal intervals in the circumferential direction of the second cylinder 32. With the cylindrical body 30 coming in contact with the metal fixture 40 under an external force applied in the second direction D2, the resultant force on the cylindrical body 30 is applied by the multiple contact portions 45 in the direction substantially aligned with the axial direction of the cylindrical body 30. This can reduce bending moment in the cylindrical body 30. This can reduce breakage of the cylindrical body 30. The heater 1 can thus have improved durability and reliability.

As illustrated in, for example, FIG. 7, at least one ridge 33 may include a protrusion 33*b* having a greater height from the outer circumferential surface 32*a* of the second cylinder 32 than the outer circumferential surface 31*a* of the first cylinder 31. With the protrusion 33*b* coming in contact with the metal fixture 40 under an external force in the second direction D2 applied to the cylindrical body 30, the metal fixture 40 effectively avoids moving relative to the cylindrical body 30 in the first direction D1. With the metal fixture 40 moving over the protrusion 33*b* and moving relatively in the first direction D1 and the contact portion 45 coming in contact with the first cylinder 31, the metal fixture 40 can avoid moving relative to the cylindrical body 30 in the first direction D1. With the ridge 33 including the protrusion 33*b*, the cylindrical body 30 can effectively avoid slipping off the metal fixture 40 under an external force applied in the second direction D2. This thus improves the durability and reliability of the heater 1.

For the ridge 33 extending across the entire second cylinder 32 in the longitudinal direction, the protrusion 33*b* may be located at an end of the ridge 33 facing the first cylinder 31 and may be adjacent to the first cylinder 31 as illustrated in, for example, FIG. 7. This improves the mechanical strength of the protrusion 33*b* and reduces cracks in the protrusion 33*b* when the protrusion 33*b* comes in contact with the metal fixture 40. This thus improves the durability and reliability of the heater 1.

At least one ridge 33 may include a cutout 33*c* in the outer surface in the radial direction of the second cylinder 32. In this case, when the cylindrical body 30 moves relative to the metal fixture 40 in the second direction D2 under an external force in the second direction D2 applied to the cylindrical body 30, the metal fixture 40 can be caught in the cutout 33*c* with its elastic restoring force as illustrated in, for example, FIG. 8. Under an external force in the second direction D2 applied to the cylindrical body 30, the metal fixture 40 has its portion caught in the cutout 33*c* in contact with the inner circumferential surface of the cutout 33*c* and is thus restricted from moving relative to the cylindrical body 30 in the first direction D1. With the contact portion 45 coming in contact with the first cylinder 31 when the metal fixture 40 relatively moves in the first direction D1 by moving over the cutout 33*c*, the metal fixture 40 can avoid moving relative to the cylindrical body 30 in the first direction D1. Under an external force in the first direction D1 applied to the cylindrical body 30, the metal fixture 40 has its portion caught in the cutout 33*c* in contact with the inner circumferential surface of the cutout 33*c* and is thus restricted from moving relative to the cylindrical body 30 in the second direction D2. The cylindrical body 30 can effectively avoid slipping off the metal fixture 40 under an external force applied in the first direction D1 or in the second direction D2 when the ridge 33 includes the cutout 33*c*. This thus improves the durability and reliability of the heater 1.

The metal fixture 40 may be placed in the cutout 33*c* when the heater 1 is manufactured or when the heater 1 is mounted in an external device.

As illustrated in, for example, FIG. 9, in the metal fixture 40, the inner circumferential surface 44*a* of the second hole 44 in the plate member 42 may be connected to an end of the outer circumferential surface 41*a* of the cylindrical part 41 facing the second end. This allows the plate member 42 to be apart from the heat element 20, thus avoiding heat generated by the heat element 20 dissipated more than intended outside through the plate member 42. This can improve the heating efficiency of the heater 1.

The present disclosure may be implemented in the following forms.

In one or more embodiments of the present disclosure, a heater includes a base in a rod shape or a cylindrical shape, a heat element embedded in the base, a cylindrical body including a first end and a second end being open, and a metal fixture including a first hole receiving the cylindrical body. The cylindrical body includes a first cylinder including the first end and a second cylinder including the second end and continuous with the first cylinder. The second cylinder has a smaller outer diameter than the first cylinder. The cylindrical body includes at least one ridge located on an outer circumferential surface of the second cylinder and extending in an axial direction of the second cylinder. The cylindrical body receives the base with an end of the base placed and fixed through the first end being open. An inner circumferential surface of the first hole surrounds the second cylinder. The metal fixture is in contact with the at least one ridge.

The heater according to one or more embodiments of the present disclosure can have improved durability and reliability.

Although the embodiment of the present disclosure has been described in detail, the present disclosure is not limited to the embodiment described above, and may be changed or modified in various manners without departing from the spirit and scope of the present disclosure. The components described in the above embodiment may be entirely or partially combined as appropriate unless any contradiction arises.

REFERENCE SIGNS

1 heater
10 base
10*a* one end
10*b* the other end
11 conductor layer
20 heat element
20*a* one end
20*b* the other end
21 lead terminal
30 cylindrical body
30*a* first end
30*b* second end
30*c* inner circumferential surface
31 first cylinder
31*a* outer circumferential surface
31*b* opening
32 second cylinder
32*a* outer circumferential surface
32*b* contact area
33 ridge
33*a* tip surface
33*b* protrusion
33*c* cutout
40 metal fixture
41 cylindrical part
41*a* outer circumferential surface
42 plate member
43 first hole
43*a* inner circumferential surface
44 second hole
44*a* inner circumferential surface
45 contact portion
50 adhesive

The invention claimed is:

1. A heater comprising:
a base having a rod shape or a cylindrical shape;
a heat element embedded in the base;
a cylindrical body including
a first cylinder including a first end that is open,
a second cylinder including a second end that is open, the second cylinder being continuous with the first cylinder and having a smaller outer diameter than the first cylinder,
at least one ridge located on an outer circumferential surface of the second cylinder and extending in an axial direction of the second cylinder, the cylindrical body receiving the base with an end of the base placed and fixed through the first end, and
wherein the first cylinder, the second cylinder, and the at least one ridge are being continuous with one another; and
a metal fixture being in contact with the at least one ridge and including a first hole receiving the cylindrical body, an inner circumferential surface of the first hole surrounding the second cylinder.

2. The heater according to claim 1, wherein
the at least one ridge includes a plurality of ridges spaced apart from one another in a circumferential direction of the second cylinder.

3. The heater according to claim 2, wherein
the plurality of ridges is at equal intervals in the circumferential direction.

4. The heater according to claim 1, wherein
the at least one ridge includes a protrusion having a greater height from the outer circumferential surface of the second cylinder than from an outer circumferential surface of the first cylinder.

5. The heater according to claim 4, wherein
the at least one ridge extends across the outer circumferential surface of the second cylinder in the axial direction, and
the protrusion is located at an end of the at least one ridge facing the first end.

6. The heater according to claim 1, wherein
the at least one ridge includes a cutout from an outside in a radial direction of the second cylinder.

7. The heater according to claim 1, wherein
the metal fixture includes a cylindrical part including the first hole and a plate member including a second hole, and
an inner circumferential surface of the second hole is connected to an end of an outer circumferential surface of the cylindrical part facing the first end.

8. The heater according to claim 1, wherein
the metal fixture includes a cylindrical part including the first hole and a plate member including a second hole, and an inner circumferential surface of the second hole is connected to an end of an outer circumferential surface of the cylindrical part facing the second end.

9. The heater according to claim 1, further comprising:

a lead terminal joined to the end of the base and electrically connected to the heat element, wherein the metal fixture overlaps a joint between the base and the lead terminal as viewed in a radial direction of the cylindrical body.

10. The heater according to claim 9, wherein an adhesive is filled between an inner circumferential surface of the cylindrical body and the base, and the adhesive covers the joint between the base and the lead terminal.

11. The heater according to claim 1, wherein a clearance is provided between the outer circumferential surface of the second cylinder and the inner circumferential surface of the first hole.

* * * * *